(12) United States Patent
Shi et al.

(10) Patent No.: US 12,004,276 B2
(45) Date of Patent: Jun. 4, 2024

(54) DRIVING CIRCUIT, AND LED CIRCUIT AND A DRIVING METHOD

(71) Applicant: SIGNIFY HOLDING B.V., Eindhoven (NL)

(72) Inventors: Liang Shi, Shanghai (CN); Shan Wang, Shanghai (CN)

(73) Assignee: SIGNIFY HOLDING B.V.

( * ) Notice: Subject to any disclaimer, the term of this patent is extended or adjusted under 35 U.S.C. 154(b) by 9 days.

(21) Appl. No.: 17/922,362

(22) PCT Filed: May 20, 2021

(86) PCT No.: PCT/EP2021/063420
§ 371 (c)(1),
(2) Date: Oct. 29, 2022

(87) PCT Pub. No.: WO2021/234070
PCT Pub. Date: Nov. 25, 2021

(65) Prior Publication Data
US 2023/0180365 A1  Jun. 8, 2023

(30) Foreign Application Priority Data

May 21, 2020 (WO) ................ PCT/CN2020/091564
Aug. 17, 2020 (EP) ..................................... 20191285

(51) Int. Cl.
*H05B 45/3725* (2020.01)
*H05B 45/59* (2022.01)

(52) U.S. Cl.
CPC ......... *H05B 45/3725* (2020.01); *H05B 45/59* (2022.01)

(58) Field of Classification Search
None
See application file for complete search history.

(56) References Cited

U.S. PATENT DOCUMENTS

| 9,763,296 B1* | 9/2017 | Milanesi ................ H05B 45/44 |
| 2011/0140630 A1* | 6/2011 | Doudousakis ........ H02M 3/156 |
| | | 363/124 |
| 2012/0320641 A1 | 12/2012 | Chapman |
| 2014/0097821 A1* | 4/2014 | Chen ....................... G05F 1/468 |
| | | 323/293 |

* cited by examiner

*Primary Examiner* — Anh Q Tran (57) ABSTRACT

A driving circuit comprises a switch mode power converter circuit to convert a supply voltage (e.g. rectified mains), including an energy storage component and a main control switch. The energy storage component discharges to provide a regulated DC current to an output load upon the switching of the main control switch. A time-varying offset is used to modulate the regulated current hereby controlling the voltage across the energy storage component. In this way, the voltage across the energy storage component is maintained above the supply voltage with a safety margin, and this is used to prevent input current spikes and hence prevent an efficiency reduction of the driver circuit.

15 Claims, 7 Drawing Sheets

FIG. 7

DRIVING CIRCUIT, AND LED CIRCUIT AND A DRIVING METHOD

CROSS-REFERENCE TO PRIOR APPLICATIONS

This application is the U.S. National Phase application under 35 U.S.C. § 371 of International Application No. PCT/EP2021/063420, filed on May 20, 2021, which claims the benefits of European Patent Application No. 20191285.4, filed on Aug. 17, 2020 and Chinese Patent Application No. PCT/CN2020/091564, filed on May 21, 2020. These applications are hereby incorporated by reference herein.

FIELD OF THE INVENTION

This invention relates to a driving circuit, in particular for driving an LED load.

BACKGROUND OF THE INVENTION

LED lighting has been popular for several years, and customer requirements on the light quality are continuously increasing.

Many lighting applications require a high power factor and low total harmonic distortion, while also maintaining a flicker free light output. Especially for indoor professional applications, lighting flicker can cause discomfort to the eyes and also make work tasks more difficult.

Typically, a dual-stage driver is used in order to achieve a high power factor as well as flicker free application. With increasingly tight requirements on cost, a single stage topology (or one and a half stage topology) would be preferred, to balance cost and performance.

Examples of popular single stage driver topology are a SEPIC converter and Cuk converter, to provide a low cost and reasonable performance. A single stage converter only has one control input to define the setting of the driver, rather than having a separate PFC stage. A problem encountered in some single stage driver designs (discussed further below) which implement power factor correction is that a current spike in the input current can arise, reducing the power factor and total harmonic distortion (THD) of the driver.

This may be caused if the voltage stored on a capacitor in series with the load drops below a rectified input voltage, so that a current can flow directly from the input to charge the capacitor without any control.

The current spike can be removed by selecting suitable component values in the driver circuit, but this is at the expense of reduced efficiency, and/or larger and more expensive components.

There is therefore a need for an improved driver design, which enables input current spikes to be avoided without significant impact on the system efficiency or cost of the components needed.

US2012/0320641A1 discloses a method that controls the phase angle to provide a margin between the voltage across an energy storage capacitor and the input voltage.

20110140630A1 discloses a SEPIC converter with an output current control, which uses a fixed reference current.

SUMMARY OF THE INVENTION

The invention is defined by the claims.

It is a concept of the invention to provide a time-varying adaption of the reference current used for controlling the generation of a regulated current from a driver which uses a switch mode power converter. In particular, a time-varying offset is provided to modulate the regulated (output) current. By modulating the current, the discharging of the energy storage component is limited and the voltage across the energy storage component is maintained. In this way, input current spikes can be avoided by ensuring the voltage across the energy storage component (e.g. capacitor) of the switch mode power converter remains above the supply voltage. Therefore when the supply voltage charges the energy storage component, the charging is under control.

According to the invention, there is provided a driving circuit comprising:
  a converter comprising:
    an input to receive a supply voltage with a cyclic ripple having peak portions and valley portions;
    a switch mode power converter circuit to convert the supply voltage, including an energy storage component and a main control switch;
    an output; and
    a current sensor for sensing an output current delivered at the output and generating a sensed current signal;
  a control circuit to control a switching of the main control switch of the converter circuit, wherein the energy storage component is adapted to discharge to provide a regulated DC current at the output upon the switching of the main control switch; and
  a modulation circuit to apply a time-varying offset to the control circuit to modulate the regulated current thereby controlling the voltage across the energy storage component, wherein the modulation circuit comprises a ramp circuit for generating a time-varying ramp signal for combination with a static reference current signal to generate the modulated reference current signal and the control circuit comprises a comparator circuit for comparing the sensed current signal with the modulated reference current signal and an output of the comparator is used to provide a current feedback signal for the control circuit so that the time-varying offset is adapted to ensure a margin of the voltage across the energy storage component above the supply voltage.

This driver adapts the regulated current in such a way that a voltage ripple across an energy storage component of the converter is reduced, by ensuring the voltage stored across the energy storage component remains above the supply voltage, namely a safety margin. This measure can be used to prevent flow of current to the energy storage component from the supply voltage outside the control of the control circuit. Such flows of current can cause current spikes in the input current drawn from the supply. The invention enables these current spikes to be prevented while avoiding increasing the size of the energy storage component and avoiding using undesirable other component values (such as inductances).

The time-varying offset for example reduces the regulated current when the supply voltage is at its valley portions. The effect of this is to reduce the release of energy from the energy storage component and thereby maintain a more uniform (high) voltage across the energy storage component.

The offset for example corresponds to a modification of the regulated current of less than 5% of the regulated current, the valley portion is the portion with an amplitude below 30% of the average amplitude of the supply voltage. The loss of output due to the reduced current can be compensated by increasing the regulated current at the peak portion, in which case the energy storage component already has been charged to a high voltage by the peak portion of the supply voltage. Thus, the energy storage component can release more energy while still keeping the safety margin. The peak portion is the portion with an amplitude above 70% of the average amplitude of the supply voltage.

Note that these definitions of the peak and valley portions are somewhat arbitrary. The modulation of the current is relatively small such as 5% such that the effect on the LED current, and hence on the light output, is not, or is barely, perceivable. The 5% flicker is also acceptable by the product certification authority.

The time-varying offset for example decreases the regulated current during a decrease in the supply voltage to the valley portion when the main control switch is switched in a period of time that the energy storage component is releasing energy, such that the energy storage component is adapted to be discharged in a limited manner. The energy storage component thereby has a retained voltage such that the voltage on the energy storage component remains higher than the supply voltage, especially when the peak portion of the supply voltage arrives.

The offset thereby ensures that there is a sufficient retained voltage on the energy storage component such that in the subsequent phase of operation, with the main control switch off to allow the supply voltage to charge the energy storage component, the voltage remains higher than the supply voltage.

The time-varying offset for example increases the regulated current during an increase in the supply voltage to the peak portion when the main switch is switched in a period time that the energy storage component is releasing energy, wherein the increase in the regulated current is adapted to compensate the decrease of the regulated current in the valley portion such that the average current meets the regulated DC current.

Thus, the desired overall current regulation implemented by the driver is not affected.

Thus, the modulation is implemented by adapting the reference current used in a current feedback control loop. This avoids the need to alter the feedback control approach itself. The modulation may be achieved simply by pre-processing the reference current signal.

The ramp circuit is for generating a triangular time-varying offset signal as the time-varying ramp signal. A ramp signal generator is a simple low cost circuit, which can be used to adapt the reference current signal. It is for example driven by a square wave signal.

The ramp circuit is adapted for generating the ramp signal such that the modulated reference current signal has a valley value at the zero crossing of the AC mains and a peak value at the peak of the AC mains.

This modulated reference current makes the output current small at the zero crossing of the AC mains, thus the energy in the capacitor is reserved at that moment; and when the AC mains is at peak, the reserved energy in the capacitor is sufficient to keep the voltage on the capacitor has above the peak AC mains by the safe margin thus prevent inrush/spike input current.

The switch mode power converter circuit for example comprises a one and half stage switch mode power converter with an input stage and an output stage, wherein the input stage comprises a power commutation inductor different from the energy storage component, and the energy storage component comprises a capacitor, in series between the input and output stages.

A so-called one and a half stage converter has an input stage and an output stage but uses a single shared control switch and thus has only one control circuit. The single control switch controls the charging and discharging of both the power commutation inductor and the energy storage component (e.g. capacitor).

The energy storage capacitor is in this example a bulk storage capacitor in series between the input and output, and is charged from the supply and discharged to the load during the cyclic operation of the switch mode power converter.

In particular:
the input stage is adapted to charge the power commutation inductor from the supply voltage, and the energy storage component is adapted to discharge into the output stage, when the main control switch is switched on; and
the input stage is adapted to allow the power commutation inductor and the supply voltage to charge the energy storage component, and the output stage is adapted to release the discharge previously from the energy storage component, when the main control switch is switched off.

In a first example, the converter comprises a SEPIC converter, wherein the input stage comprises the power commutation inductor in series with the input and the main control switch to ground, and the output stage comprises a parallel inductor and a diode in series with the output, wherein the input stage further comprises a series diode at the input.

In a second example, the converter comprises a Cuk converter, wherein the input stage comprises the power commutation inductor in series with the input and the main control switch to ground, and the output stage comprises a parallel diode and an inductor in series with the output, wherein the input stage further comprises a series diode at the input.

In a third example, the converter comprises a BiFRED converter, wherein the input stage comprises the power commutation inductor in series with the input and the main control switch to ground, and the output stage comprises a parallel transformer and a diode in series with the output, wherein the input stage further comprises a series diode at the input.

Thus, there are different converter topologies which may be used within the driving circuit of the invention.

The invention also provides a LED circuit comprising:
the driving circuit as define above; and
an LED arrangement connected to the output of the converter.

The LED circuit for example further comprises:
an AC input;
a rectifier; and
a smoothing capacitor in parallel across the output of the rectifier,
wherein the output of the rectifier comprises the supply voltage with a cyclic ripple.

The LED circuit is thus driven by an AC input, such as the mains, and delivers a high power factor and low total harmonic distortion with a single stage (or one and half stage) driver topology.

The invention also provides a driving method comprising:
receiving a supply voltage with a cyclic ripple having peak portions and valley portions;
converting the supply voltage using a switch mode power converter circuit including an energy storage component and a main control switch;

controlling switching of the main control switch of the switch mode power converter circuit to provide a regulated current at the output wherein the energy storage component is adapted to discharge to provide a regulated DC current upon the switching of the main control switch;

sensing an output current delivered at the output and generating a sensed current signal; and using a time-varying offset to modulate the regulated current thereby controlling the voltage across the energy storage component, thereby ensure a margin of the voltage across the energy storage component above the supply voltage, wherein the step of using a time-varying offset to modulate comprises generating a time-varying ramp signal for combination with a static reference current signal to generate the modulated reference current signal;

and the step of controlling switching of the main control switch comprises comparing the sensed current signal with the modulated reference current signal and an output of the comparing is used to provide a current feedback signal for the controlling.

The method may comprise using the time-varying offset to decrease the regulated current during a decrease in the supply voltage to the valley portion such that the energy storage component is adapted to be discharged in a limited manner. thereby having a retained voltage such that the voltage on the energy storage component remains higher than the supply voltage in the peak portion, wherein generating the ramp signal such that the modulated reference current signal has a valley value at the zero crossing of the AC mains and a peak value at the peak of the AC mains.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a driving circuit comprising a switch mode power converter circuit to convert a supply voltage (e.g. rectified mains), including an energy storage component and a main control switch. The energy storage component discharges to provide a regulated DC current to an output load upon the switching of the main control switch. A time-varying offset is used to modulate the regulated current thereby controlling the voltage across the energy storage component. In this way, the voltage across the energy storage component is maintained above the supply voltage with a safety margin, and this is used to prevent that the supply voltage becomes higher than the voltage across the energy storage component and to prevent input current spikes that can not be controlled, and hence prevent a power factor THD reduction of the driver circuit.

Figure 1:
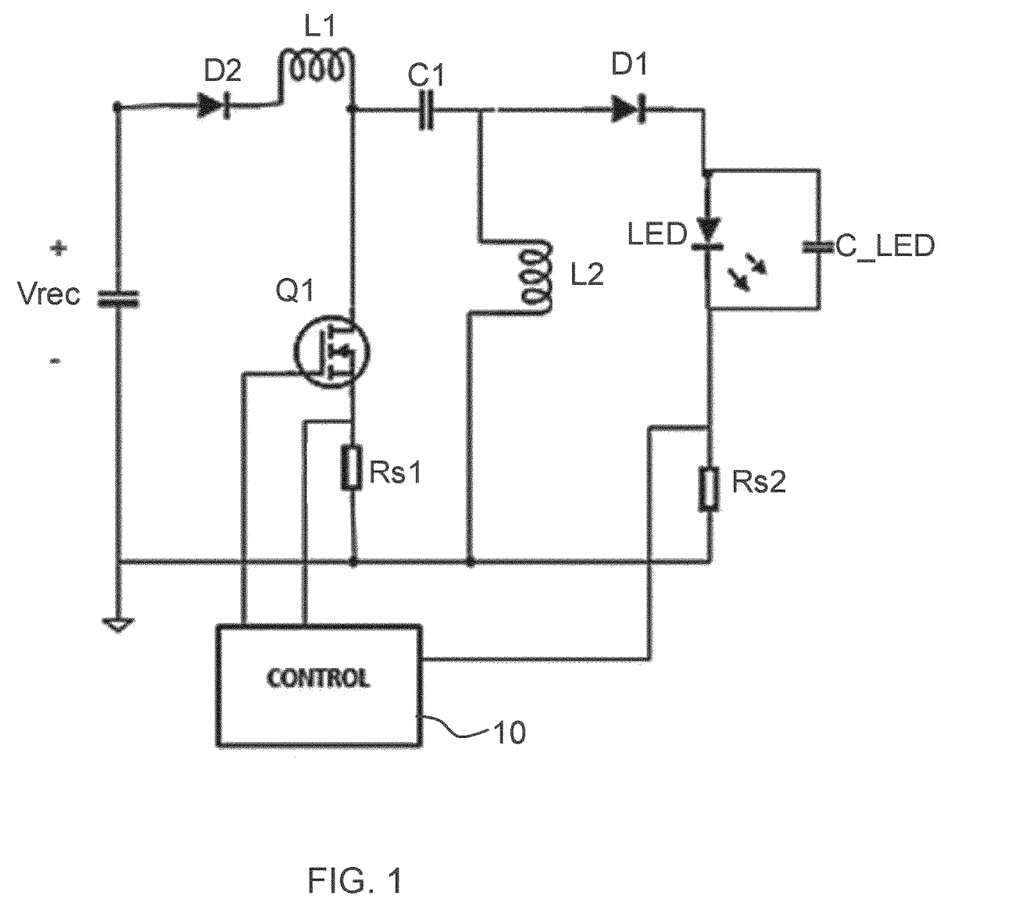
FIG. 1 shows a 1.5 stage SEPIC (single-ended primary-inductor) converter.

FIG. 1 shows in schematic form a 1.5 stage SEPIC (single-ended primary-inductor) converter. A rectified AC signal Vrec is provided as the input. The converter comprises a first, power commutation, inductor L1 in series with the input, and a series capacitor C1 which functions as an energy storage component. The junction between them (the connection between an output side of the inductor L1 and an input side of the capacitor C1) is connected to ground, through a current sense resistor Rs1, and through the main control switch Q1. The first inductor L1 is thus in series with the main control switch Q1 between the input and ground. These components define an input stage. The current sense resistor Rs1 is for sensing the inductor current flowing through the main control switch Q1.

The current sensing signal using Rs1 is used for peak current control, using a reference signal comes from the feedback signal relating to the LED current. The current signal through the main control switch Q1 is also used for over current protection.

An output stage comprises a parallel inductor L2 (between the output side of the capacitor C1 and ground) and a diode D1 in series with the output. The output is an LED stage shown with a parallel storage capacitor C_LED, and a further current sense resistor Rs2 is in series with the LED load for sensing the output current.

The components above correspond to a standard SEPIC converter. An extra anti-reverse diode D2 is added at the input, and the capacitor C1 is implemented as a high capacitance bulk capacitor. This is known as a modified SEPIC ("m-SEPIC") circuit. This modification enables high PF operation.

The size of bulk capacitor depends on the power of circuit. the capacitor could may for example be 10 μF, whereas for a regular SEPIC circuit, several hundred nF is typical.

The diode D2 ensures that the energy of the bulk capacitor C1 does not flow back to the input. In addition, the inductance ratio L2/L1 maintains the bulk capacitor voltage high enough at all times to sustain the LED current without a current ripple.

A controller 10, in particular a control circuit, controls the operation of the main switch based on the sensed currents. The controller controls the main control switch to achieve a desired output regulated current, in particular by controlling the duty cycle (and/or frequency) of switching of the main control switch.

When the main switch Q1 is turned on, the supply voltage charges the inductor L1, while the capacitor C1 discharges to the inductor L2, both through switch Q1. When the main switch Q1 is turned off, the inductor L1 and the supply voltage form a boost converter to charge the capacitor C1; while the inductor L2 freewheels to release current to the LED, via the diode D1.

Figure 2:
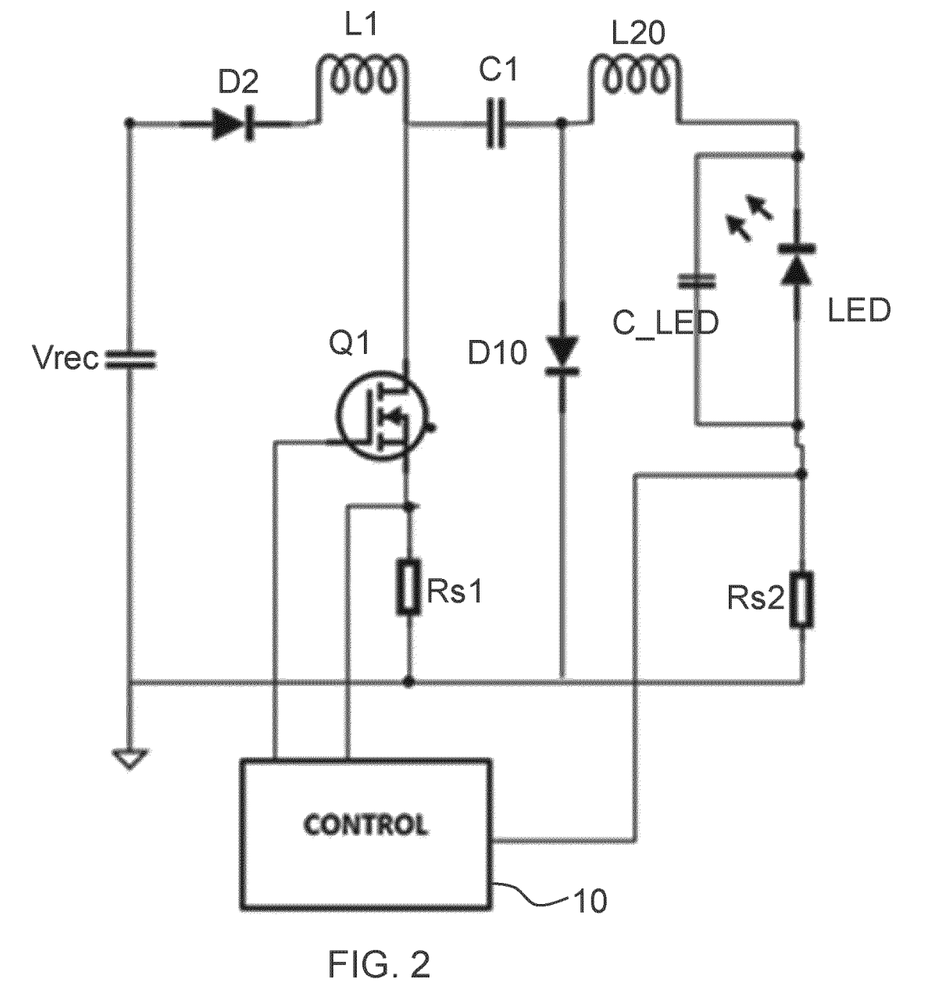
FIG. 2 shows a 1.5 stage Cuk converter.

FIG. 2 shows a 1.5 stage Cuk converter. A rectified AC signal Vrec is provided as the input. The converter again comprises a first, power commutation, inductor L1 in series with the input, and a series capacitor C1 functioning as an energy storage component. The junction between them (the connection between an output side of the inductor L1 and an input side of the capacitor C1) is connected to ground, through a current sense resistor Rs1 and the main control switch Q1. The first inductor L1 is thus in series with the input and the main control switch Q1 to ground. These components define an input stage. The current sense resistor Rs1 is for sensing the inductor current.

An output stage comprises a parallel diode D10 between the output side of the capacitor C1 and ground and an inductor L20 in series with the output. The output is an LED stage (with opposite polarity to FIG. 1) shown with a parallel storage capacitor C_LED. A further current sense resistor Rs2 is in series with the LED load for sensing the output current.

The components above correspond to a standard Cuk converter. An extra anti-revise diode D2 is again added, and the capacitor C1 is implemented as a high capacitance bulk capacitor.

When the main switch Q1 is turned on, the supply voltage charges the inductor L1, while the capacitor C1 discharges to the inductor L20 and the LED, both through switch Q1. When the main switch Q1 is turned off, the inductor L1 and the supply voltage form a boost converter to charge the capacitor C1 via D10; while the inductor L20 freewheels to release current to the LED, via the diode D10.

Figure 3:
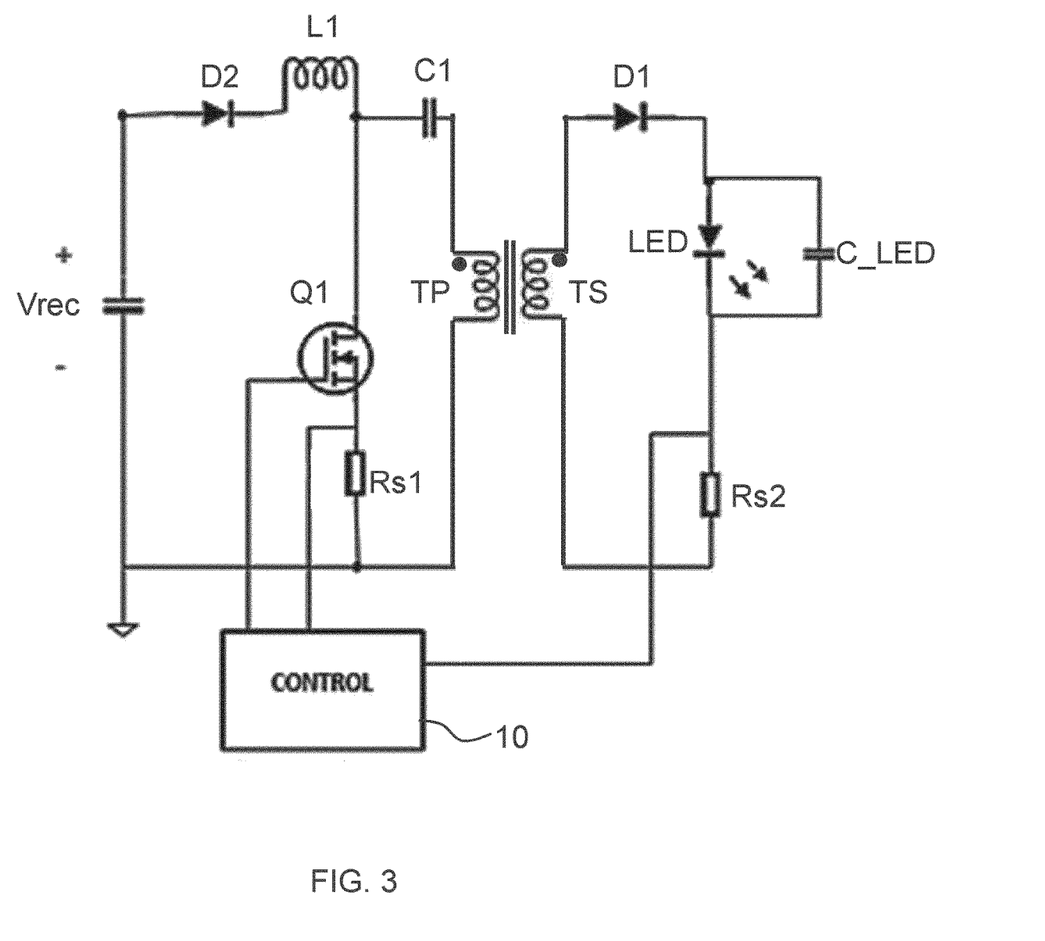
FIG. 3 shows a BiFRED converter.

FIG. 3 shows a BiFRED (boost integrated flyback) converter. This corresponds to the SEPIC converter of FIG. 1, but with a transformer with primary side winding TP and secondary side winding TS replacing the inductor L2. The primary side of the transformer forms the inductor of the input stage and the secondary side of the transformer forms part of the output stage and delivers current to the load. As in FIG. 1, a rectified AC signal Vrec is provided as the input. The converter comprises a first, power commutation, inductor L1 in series with the input, and a series capacitor C1 which functions as the energy storage component. The junction between them (the connection between an output side of the inductor L1 and an input side of the capacitor C1) is connected to ground, through a current sense resistor Rs1, and through the main control switch Q1. The first inductor L1 is thus in series with the main control switch Q1 between the input and ground. These components define an input stage. The current sense resistor Rs1 is for sensing the inductor current flowing through the main control switch Q1. When the main switch Q1 is on, the Vrec charges the inductor L1; and the capacitor C1 discharges and store energy in the transformer via the primary side winding TP. When the main switch Q1 is off, the Vrec and the inductor L1 release energy to charge the capacitor C1 and the primary side winding TP; the primary side TP transferred both the stored energy discharged from C1 during main switch on and the incoming energy from the Vrec and the inductor L1 to the secondary side winding TS and to the load LED.

In an alternative topology, the C1 is moved to between the primary side winding TP and the ground, but the principle is the same.

The transformer provides an isolating bridge between the input stage and the output stage, and the output stage has a diode D1 in series with the secondary winding TS to the output.

In each of these circuits, the input receives a supply voltage (Vrec) with a cyclic ripple having peak portions and valley portions. The input is for example a rectified mains signal. The valley portions may be defined as the portions with an amplitude below 30% of the average amplitude of the supply voltage, and the peak portions may be defined as the portions with an amplitude above 70% of the average amplitude of the supply voltage.

Also, in each of these circuits, the input stage charges the power commutation inductor L1 from the supply voltage when the main control switch Q1 is switched on. During this time, the capacitor C1 discharges to the output stage (the discharge is stored in the inductor in the output stage). When the main control switch Q1 is turned off, the input stage allows the power commutation inductor L1 and the supply voltage to charge the capacitor C1. The output stage (inductor) releases the discharge that was previously provided by the capacitor C1. In other words, the current is delivered to the load from the input, via the commutation inductor L1 and the capacitor C1 (as well as with current from the inductor L2, L20).

Unlike a two stage driver, which has two separate control mechanisms, one to control the current of the inductor L1 to achieve low total harmonic distortion and one to control the current of L2 to regulate the LED current and achieve flicker free operation), the 1.5 stage topology with no separate power factor correction stage has only one control mechanism to keep the LED current ripple free.

For given input and output voltages, the voltage on the bulk capacitor is determined by the ratio of inductances L2/L1. A higher ratio corresponds to a higher voltage on the bulk capacitor which helps to remove current spikes in the mains.

In the above types of converter, and others unmentioned, the bulk capacitor voltage should be higher than the mains rectified voltage Vrec, otherwise a current will flow directly through D2, L1 and L2 to charge the bulk capacitor C1 directly without any control when the main switch Q1 is off. This results in an undesirable spike on the input current, reducing the efficiency of the circuit.

Figure 4:
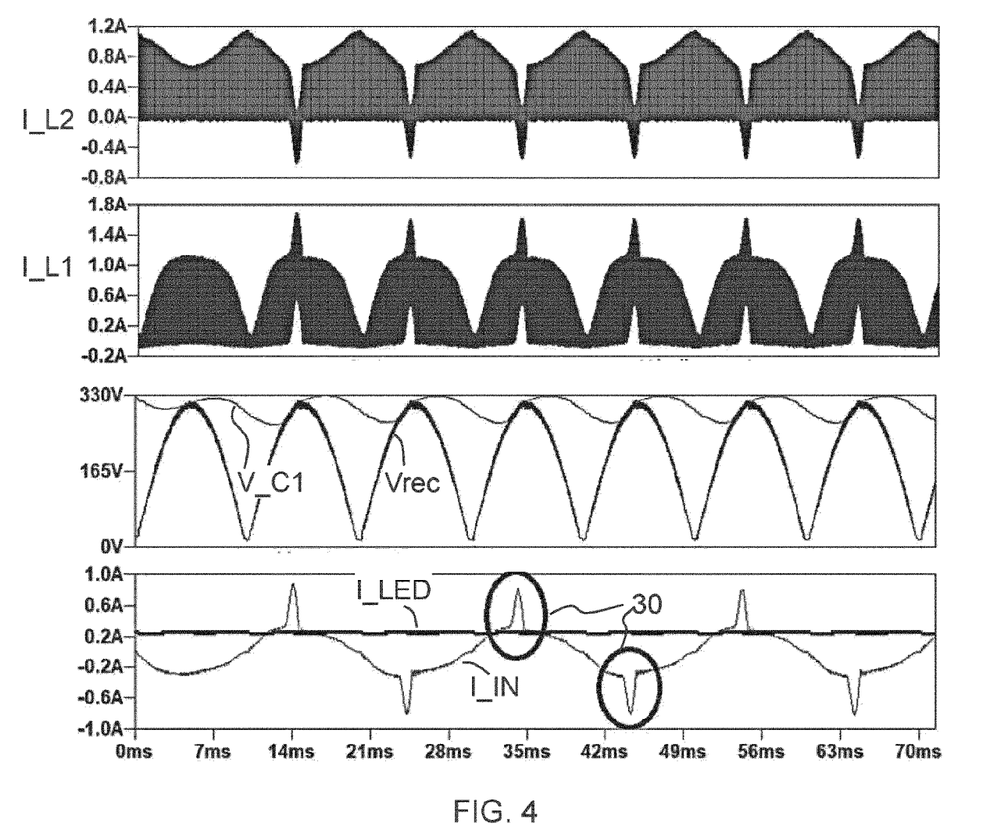
FIG. 4 shows waveforms for the operation of the circuit of FIG. 1 when current spikes arise in the input current.

FIG. 4 shows waveforms for the operation of the circuit of FIG. 1 when these current spikes arise.

The top plot shows the current I_L2 through inductor L2. The second plot shows the current I_L1 through inductor L1. The third plot shows the rectified mains voltage Vrec and the voltage V_C1 across the capacitor C1. The bottom plot shows the input current I_IN and the LED current I_LED. The current spikes in the input current are shown in regions 30. In FIG. 4, the voltage V_C1 already touches and extends below the voltage Vrec in the peak portion of the signal Vrec, so that the voltage Vrec directly charges the capacitor C1, without being controlled or limited by the boost inductor L1. This causes the relatively large current spike 30.

There are two known ways to remove the current spikes. A first is to increase the ratio L2/L1 and a second is to increase the size of the bulk capacitor C1. A smaller inductance of L1 (to increase L2/L1) results in a peak current through L1 and through the main control switch which goes up quickly, which is detrimental to efficiency. A large bulk capacitor impacts the size and cost.

The invention provides a modulation circuit to add a time-varying offset to the control circuit to modulate the regulated (output) current thereby controlling the discharge and thereby the voltage across the energy storage component (i.e. the capacitor C1). The time-varying offset ensures a safety margin of the voltage across the energy storage component above the supply voltage. This influences the LED current ripple and output power. The output power (e.g. second half stage) of the SEPIC/Cuk/BiFRED circuit is in this way controlled in order to minimize the bulk capacitor voltage variation, and thereby remove input current spikes. The invention provides a flexible design for enabling increased system efficiency.

Figure 5:
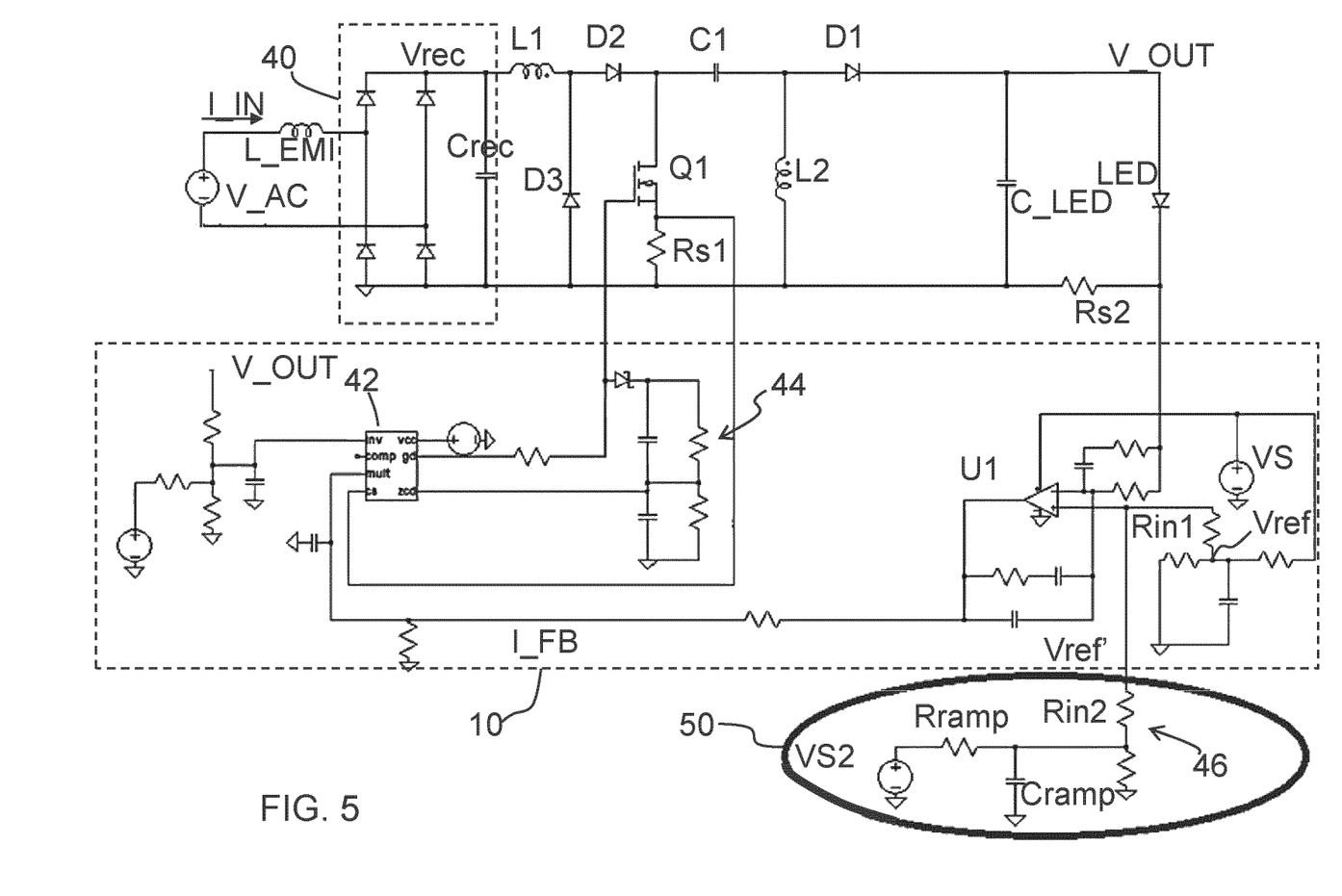
FIG. 5 shows a modified SEPIC circuit adapted in accordance with the invention.

FIG. 5 shows a modified SEPIC circuit adapted in accordance with the invention. The same adaptations may be made to the Cuk circuit or to a BiFRED circuit.

The circuit receives a mains input V_AC. The input is supplied to a diode bridge rectifier 40 through an EMI inductor L_EMI. The rectifier has an output smoothing capacitor Crec.

The output Vrec of the rectifier is provided to the converter of the type shown in FIG. 1. The same components are given the same references, namely the power communication inductor L1, diodes D1, D2, energy storage component (capacitor) C1, second inductor L2 and current sense resistors Rs1 and Rs2.

A large range of output voltages of the circuit results in a large range of bulk capacitor voltages, which complicates the circuit design.

For optimized efficiency, the ratio between the inductances of L2 and L1 has a critical value (for example L1=1 mH and L2=2.4 mH). A higher value of L1 means a lower PFC current but a lower ratio L2/L1 which therefore lowers the voltage of the bulk capacitor C1 during operation and hence increases the chances of input current spikes.

The control circuit 10 comprises an IC controller 42 for generating the gate signal for the main control switch Q1.

The IC controller 42 receives a scaled version of the output voltage V_OUT as a first feedback parameter, and the voltage across the current sense resistor Rs1 as a second feedback parameter.

The circuit 44 is for fixing a frequency of operation, and is not relevant to the invention. Diode D3 relates to EMI handling.

The IC controller also receives an output current feedback signal I_FB used by the controller for regulating the output current. The current feedback signal is based on the voltage across the second current sense resistor Rs2. A voltage signal corresponding to this current is compared by a comparator U1 (functioning as an error amplifier) with a reference voltage. The reference voltage is based in part on a desired regulated current setting, represented by a basic and static reference signal Vref. The basic reference signal is static while the current setting remains fixed. This basic reference voltage Vref is derived from a power supply voltage VS and is provided to one input of the comparator through an input resistor Rin1.

The output of the comparator U1 is used to provide a current feedback signal to the controller IC, basically indicating if the current is too high or too low.

The modulation circuit of the invention is shown as unit 50, and is discussed below.

Figure 6:
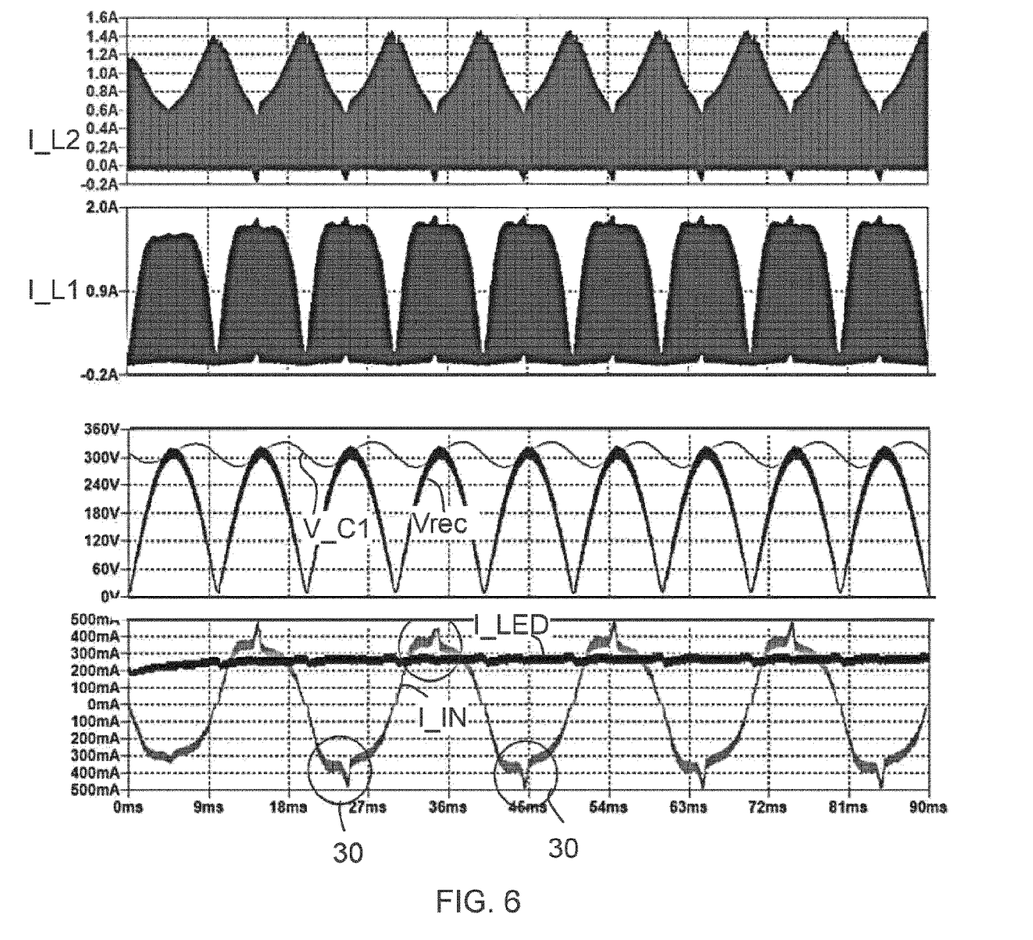
FIG. 6 is used to show the operation of the circuit of FIG. 5 but without the modulation circuit.

Without the modulation circuit 50, the circuit design settings result in the voltage across the capacitor C1 dropping to the rectified mains voltage. This is shown in FIG. 6, which is analogous with FIG. 4.

The top plot again shows the current I_L2 through inductor L2. The second plot shows the current I_L1 through inductor L1. The third plot shows the rectified mains voltage Vrec and the voltage V_C1 across the capacitor C1. The bottom plot shows the input current I_IN and the LED current I_LED. The current spikes in the input current are again shown in regions 30.

During these regions, an uncontrolled current passes through L1, D2 and L2 to charge the capacitor C1. This uncontrolled current results in the spikes shown on the mains input current.

The modulation circuit 50 is for modulating the basic reference voltage Vref. The modulation circuit 50 comprises a ramp circuit for generating a triangular time-varying offset signal. The ramp circuit comprises a square wave voltage input VS2 applied to a capacitor Cramp through a ramp resistor Rramp. The resulting voltage is combined with the basic reference voltage Vref via a resistor network 46 including a second input resistor Rin2. In this way, the ramp signal is combined with the reference current signal Vref to generate a modulated reference current signal Vref with a time varying characteristic.

The modulation is used to adapt the voltage variation across the capacitor C1 and in particular to avoid the capacitor voltage dropping to the level of the rectified voltage (at any point in time), and thereby remove the input current spikes.

For regular designs without the modulation circuit, the control circuit will have a fast response current feedback loop control. The control loop will try to remove all the mains frequency ripple on the output LED current such that the output current strictly follows the reference signal Vref applied to the positive input of comparator U1.

The modulation circuit effectively generates an injection signal which is applied to the basic reference signal Vref to trim the LED output current. The modulation circuit injects current into the LED current feedback control loop. This signal will generate a very small LED current ripple, for example below 5% of the current level (for example in the range 3% to 5%) to the driver output. The driver output power level may be managed with very small variation using the voltage feedback. The ripple, in essence, is that at the valley of the supply voltage, less output current is provided thus more voltage is left on the capacitor C1, thus at the peak of the supply voltage, the voltage across capacitor C1 is greater and has a safety margin above the supply voltage. Optionally, the ripple also means that at the peak of the supply voltage, more output current is provided to compensate the reduced output current in the valley portion, such that the average output current is maintained.

The power variation is designed to match the ripple on V_OUT (determined by the mains frequency and filter design) and compensate for the charging and discharging of the capacitor C1.

The control signal based on the power variation may be generated by a controller or by an analog circuit which senses the ripple of Vbus (normally a 10% to 20% ripple) or the ripple on the mains taking into account the phase shift between the mains and the voltage V_OUT.

The signal amplitude is also trimmed to a value to generate the expected ripple amplitude on LED current. The circuit 50 injects a signal to generate the desired ripple on the LED current, whereas the average LED current is guaranteed by the circuit including the comparator U1.

By way of example, if the LED current ripple is about 4%, that means driver output power variation is over 4% (a higher current will result in a higher LED voltage). At the current peak, output power (to the load of the second stage) is also at maximum.

The control circuit positions this peak power point when the capacitor voltage is rising, since more of the energy coming from AC input at this time is supplied to the output rather than changing the capacitor C1. In the same way, the power valley of the output is positioned when the voltage across the capacitor C1 is falling, thereby to limit the discharging energy out of the capacitor C1. In this way, the voltage ripple on the capacitor is minimized without other system modifications (such as increasing the size of the capacitor C1 value or decreasing the inductance ratio L2/L1).

Figure 7:
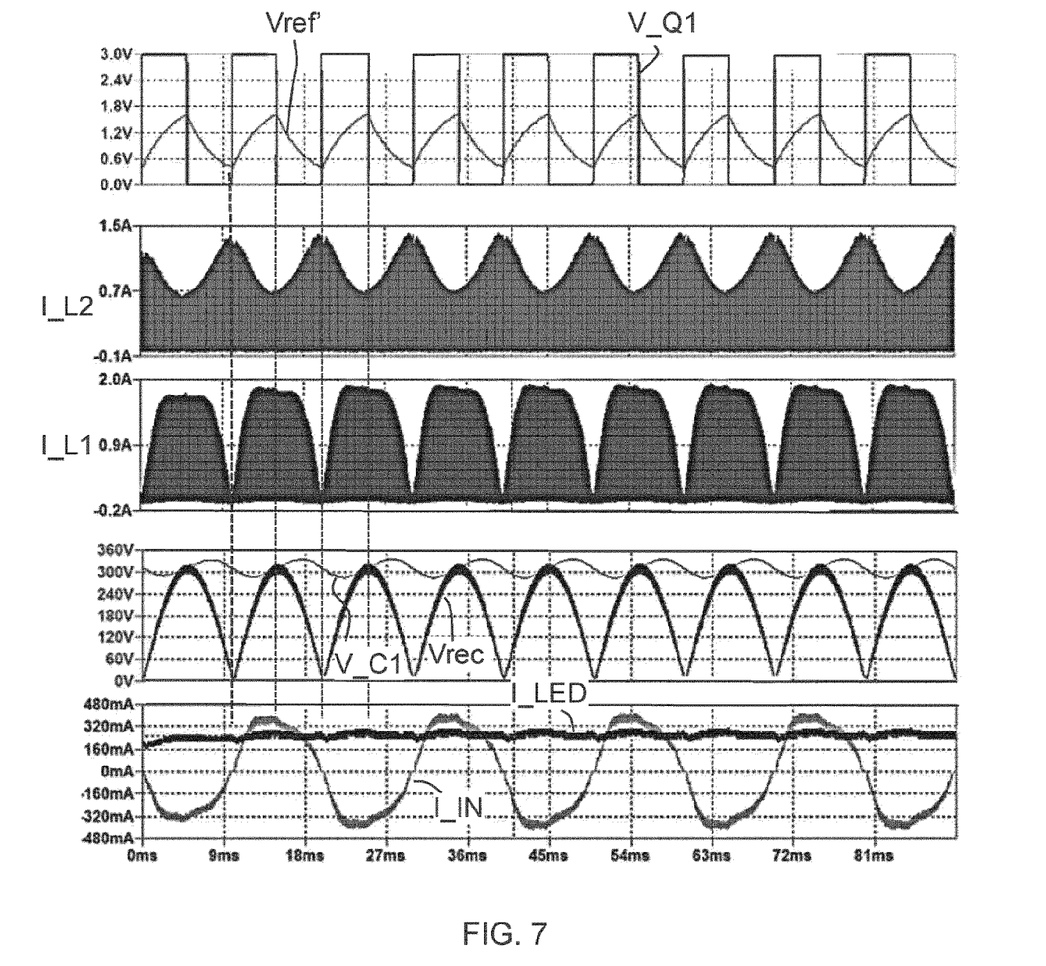
FIG. 7 is used to show the operation of the circuit of FIG. 5 with the modulation circuit.

FIG. 7 shows the operation of the circuit.

The top plot shows the main switch control signal V_Q1 and the compensation signal Vref used to trim the LED current I_LED.

The second plot shows the current through inductor L2. The third plot shows the current through inductor L1. The fourth plot shows the rectified mains voltage Vrec and the voltage V_C1 across the capacitor C1. The bottom plot shows the input current I_IN and the LED current I_LED.

It can be seen that when the main switch is off (V_Q1 is low) the time-varying offset decreases the regulated current during a decrease in the supply voltage to the valley portion. This means the capacitor energy storage component discharges in a limited manner. thereby having a retained voltage. The voltage on the capacitor thus remains higher than the supply voltage in the next peak portion.

It can also be seen that when the main switch is on (V_Q1 is high) the time-varying increases the regulated current during an increase in the supply voltage to the peak portion. This means the increase in the regulated current compensates the decrease of the regulated current in the valley portion such that the average current meets the regulated DC current.

The current spikes in the input current are no longer visible. This is because the output power variation and phase shift means the voltage ripple for the capacitor C1 is reduced and never touches the rectified voltage Vrec.

The compensation level may be adjusted by the control signal amplitude and will depend on the system design.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A driving circuit comprising:
    a converter comprising:
        an input to receive a supply voltage with a cyclic ripple having peak portions and valley portions;
        a switch mode power converter circuit to convert the supply voltage, including an energy storage component and a main control switch;
        an output; and
        a current sensor for sensing an output current delivered at the output and generating a sensed current signal;
    a control circuit to control a switching of the main control switch of the converter circuit, wherein the energy storage components is adapted to discharge to provide a regulated DC current at the output upon the switching of the main control switch; and
    a modulation circuitry to apply a time-varying offset to the control circuit to modulate the regulated current thereby controlling the voltage across the energy storage component, wherein the modulation circuit comprises a ramp circuit for generating a time-varying ramp signal for combination with a static reference current signal to generate a modulated reference current signal and the control circuit comprises a comparator circuit for comparing the sensed current signal with the modulated reference current signal and an output of the comparator is for providing a current feedback signal for the control circuit so that the time-varying offset is adapted to ensure a margin of the voltage across the energy storage component above the supply voltage.

2. The driving circuit of claim 1, wherein the offset corresponds to a modification of the regulated current of less than 5% of the regulated current, the valley portion is the portion with an amplitude below 30% of the average amplitude of the supply voltage, and the peak portion is the portion with an amplitude above 70% of the average amplitude of the supply voltage.

3. The driving circuit of claim 1, wherein the time-varying offset is adapted to decrease the regulated current during a decrease in the supply voltage to the valley portion when the main control switch is switched, such that the energy storage component is adapted to be discharged in a limited manner, thereby having a retained voltage such that the voltage on the energy storage component remains higher than the supply voltage in the peak portion.

4. The driving circuit of claim 3, wherein the time-varying offset is adapted to increase the regulated current during an increase in the supply voltage to the peak portion when the main control switch is switched, wherein the increase in the regulated current is adapted to compensate the decrease of the regulated current in the valley portion such that the average current meets the regulated DC current.

5. The driving circuit of claim 1, wherein the ramp circuit is adapted for generating a triangular time-varying offset signal as the time-varying ramp signal.

6. The driving circuit of claim 1, wherein the ramp circuit is adapted for generating the ramp signal such that the modulated reference current signal has a valley value at the zero crossing of the AC mains and a peak value at the peak of the AC mains.

7. The driving circuit of claim 1, wherein the switch mode power converter circuit comprises a one and half stage switch mode power converter with an input stage and an output stage, wherein the input stage comprises a power commutation inductor, and the energy storage component comprises a capacitor, in series between the input and output stages.

8. The driving circuit of claim 7, wherein:
    the input stage is adapted to charge the power commutation inductor from the supply voltage, and the energy storage component is adapted to discharge to the output stage, when the main control switch is switched on; and
    the input stage is adapted to allow the power commutation inductor and the supply voltage to charge the energy storage component, and the output stage is adapted to release the discharge of the energy storage component, when the main control switch is switched off.

9. The driving circuit of claim 8, wherein the converter comprises a SEPIC converter, wherein the input stage comprises the power commutation inductor in series with the input and the main control switch to ground, and the output stage comprises a parallel inductor and a diode in series with the output, wherein the input stage further comprises a series diode at the input.

10. The driving circuit of claim 8, wherein the converter comprises a Cuk converter, wherein the input stage comprises the power commutation inductor in series with the input and the main control switch to ground, and the output stage comprises a parallel diode and an inductor in series with the output, wherein the input stage further comprises a series diode at the input.

11. The driving circuit of claim 8, wherein the converter comprises a BiFRED converter, wherein the input stage comprises an inductor in series with the input and the main control switch to ground, and the output stage comprises a parallel transformer and a diode in series with the output, wherein the input stage further comprises a series diode at the input.

12. A LED circuit comprising:
the driving circuit of claim 1; and
an LED arrangements connected to the output of the converter.

13. The LED circuit of claim 12, further comprising:
an AC input;
a rectifier; and
a smoothing capacitor (Crec) in parallel across the output of the rectifier,
wherein the output of the rectifier comprises the supply voltage with a cyclic ripple.

14. A driving method comprising:
receiving a supply voltage with a cyclic ripple having peak portions and valley portions;
converting the supply voltage using a switch mode power converter circuit including an energy storage component and a main control switch;
controlling switching of the main control switch of the switch mode power converter circuit to provide a regulated current at the output wherein the energy storage component is adapted to discharge to provide a regulated DC current upon the switching of the main control switch;
sensing an output current delivered at the output and generating a sensed current signal; and
using a time-varying offset to modulate the regulated current thereby controlling the voltage across the energy storage component, thereby ensure a margin of the voltage across the energy storage component above the supply voltage,
wherein the step of using a time-varying offset to modulate comprises generating a time-varying ramp signal for combination with a static reference current signal to generate a modulated reference current signal; and
wherein the step of controlling switching of the main control switch comprises comparing the sensed current signal with the modulated reference current signal and an output of the comparing is used to provide a current feedback signal for the controlling.

15. The method of claim 14, further comprising using the time-varying offset to decrease the regulated current during a decrease in the supply voltage to the valley portion such that the energy storage component is adapted to be discharged in a limited manner, thereby having a retained voltage such that the voltage on the energy storage component remains higher than the supply voltage in the peak portion, wherein generating the ramp signal such that the modulated reference current signal has a valley value at the zero crossing of the AC mains and a peak value at the peak of the AC mains.

* * * * *